United States Patent Office 3,433,151
Patented Mar. 18, 1969

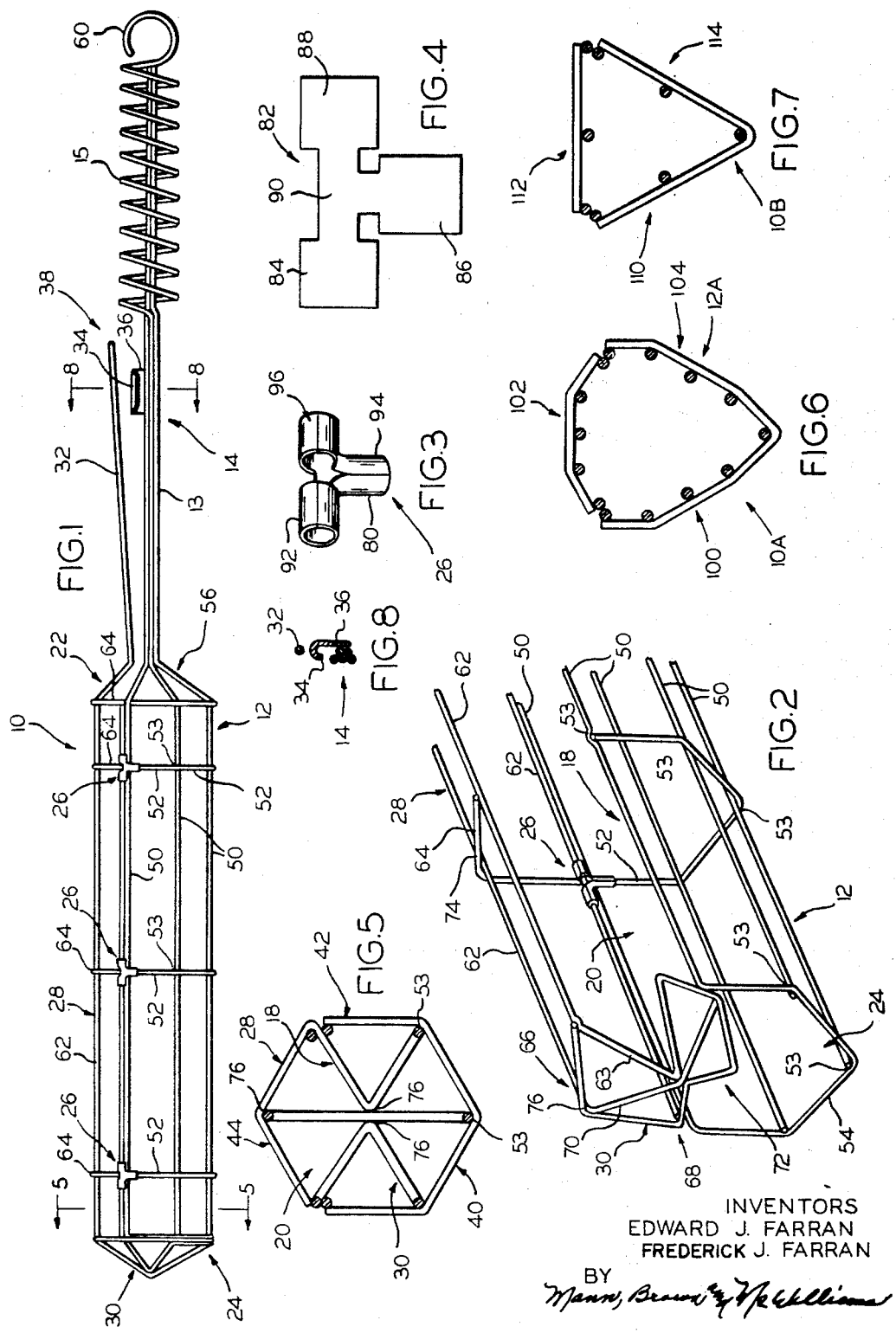

3,433,151
DEVICE FOR MAKING SHISH-KABOBS
Edward John Farran and Frederick John Farran, both of 716 Dorroll St. NE., Grand Rapids, Mich. 49505
Filed Feb. 1, 1967, Ser. No. 613,283
U.S. Cl. 99—441      5 Claims
Int. Cl. A47j 43/18

ABSTRACT OF THE DISCLOSURE

This invention relates to a device for making shish-kabobs, with the device being in the form of an elongated open mesh, open topped basket, having one of its ends open and formed to define a receptacle of shish-kabob defining configuration for food segments of the type used in this cookery that are placed in the basket for cooking. Hinged to the basket is a cover that closes the basket open top and includes an appendage which also closes the basket open end when the cover is in place. The device includes a cover handle that is positioned adjacent the handle of the basket and a releasable latch device for locking the cover handle against movement from the closed position of the cover. The food segments placed in the basket to form the shish-kabob are then cooked in the manner similar to roasting a weiner as by either hand-held, or placed on a grill, and when done, the cover is opened and the food segments slid n a row out of the basket thrugh ts food segments slid in a row out of the basket through its open end onto a plate or the like, as by using an implement to reach in through the open top and pushing on the inside end of the food segment row.

---

As is well-known to young and old alike, shish-kabobs have traditionally been made by applying segments of meat and vegetables or the like in random order on a skewer, which is then held over a fire or placed on a grill for cooking in a manner similar to skewered hotdogs.

While this manner of outdoor cookery has long been popular, it has also long been acknowledged to have some significant disadvantages that all too frequently spoil the intended result.

For instance, many of the types of foods, such as tomatoes and onions, used in making shish-kabobs, when cut to the appropriate size, by their nature do not admit of firm securement to the skewer, with the result that they all too readily fall away from the skewer before items such as meat can be cooked as desired.

Furthermore, some of the food segments during the cooking process tend to adhere to the skewer, making removal from the skewer difficult and usually resulting in the shish-kabob being completely disarrayed as a result of the removal process.

Moreover, the cooking of the shish-kabob turns out to be haphazard at best since the skewer frequently cannot be rotated conveniently to shift the side of the shish-kabob being cooked due to the tendency of some of the food segments to work their way loose and either fall off or not rotate properly when the skewer is shifted or rotated to any great extent. This usually results in the unsatisfactory result that some portions of the shish-kabob are underdone and others overdone.

A principal object of our invention is to provide a device for making shish-kabobs which provides a shish-kabob defining container in which the food segments may be placed, and which is arranged to firmly hold all the food segments in the desired position during cooking and permit the food, when cooked, to be applied to a plate or the like in the shish-kabob defining order in which it is cooked.

Another principal object of the invention is to provide a device for making shish-kabobs which enables the food to be uniformly cooked and readily removed from the device without disturbing the shish-kabob defining configuration of the food.

Further objects of the invention are to provide a device for making shish-kabobs which is in the form of a simple hand tool that can be readily used by young and old alike, which makes shish-kabob cookery safe and easy, and which is economical of manufacture, convenient in use, and readily adapted for making a wide variety of shish-kabob recipes.

Other objects, uses, and advantages will be obvious or become apparent from a consideration of the following detailed description and the application drawings in which like reference numerals are employed to designate like parts throughout the several views.

In the drawings:

FIGURE 1 is a side elevational view of one embodiment of our invention showing the cover in its closed position with the cover handle released for opening same;

FIGURE 2 is a fragmental, diagrammatic perspective view of the open end of the shish-kabob basket showing the relation of the cover thereto and the portion of the cover that closes the basket open end in the closed position of the cover, with the cover being shown partially opened and hinged on the opposite side of the basket from that shown in FIGURE 1.

FIGURE 3 is a perspective view of one form of device that may be employed to hinge the cover to the basket in the illustrated embodiment of the invention;

FIGURE 4 is a plan view of the device shown in FIGURE 3 as it is laid out for forming from a blank of suitable sheet material;

FIGURE 5 is a diagrammatic cross-sectional view substantially along line 5—5 of FIGURE 1;

FIGURES 6 and 7 are views similar to that of FIGURE 5 illustrating alternate embodiments of the invention, and FIGURE 8 is a cross-sectional view substantially along line 8—8 of FIGURE 1.

However, it is to be understood that the specific drawing illustrations provided are supplied primarily to comply with the requirements of the patent code and that the invention may have other embodiments that are intended to be covered by the appended claims.

General description

Reference numeral 10 of FIGURE 1 generally indicates one embodiment of the invention which comprises a basket 12 provided with a handle structure 14 in the form of a suitable arm 13 provided with a hand hold portion 15. The basket 12 is elongated in configuration and defines a receptacle 18 having a shish-kabob defining configuration for food segments placed therein and defining an open basket top 20 and opposed ends 22 and 24, of which the end 22 is closed and the end 24 is open, as indicated in FIGURES 1 and 2, respectively.

Hinged as at 26 to the basket 12 is a cover 28 that is formed to close the basket open top 20 and is provided with an appendage or depending portion 30 that closes the open end 24 when the cover 28 is swung to its closed position over the open top of the basket (see FIGURE 5). Cover 28 includes a handle portion 32 that extends from the area of the basket 12 to adjacent the handle 15 for ready manipulation by the user and so that it may be applied underneath the turned-over end 34 of hold-down clip 36 attached to the handle 14 for the purpose of holding the cover in its closed position and forming a releasable latch device 38.

In use, the cover 28 is released from the latch device 38 and swung to its full open position which exposes the open top 20 of the basket 12. The food segments that are to make up a shish-kabob are then placed in the usual row within the basket and between the two basket ends 22 and 24 in substantial abutting relation so that they do not shift readily within the basket as the device 10 is moved or rotated. The cover is then swung back to its closed position and its handle 32 applied to latch device 38, after which the shish-kabob is ready for cooking.

The device 10 is then manipulated to hold or place the basket 12 over a suitable source of heat, such as a fire or charcoal grill and the shish-kabob is cooked to the extent desired. During the cooking process, the device 10 may be shifted or rotated periodically about its longitudinal axis to present a new side of the shish-kabob for cooking. In the embodiment of FIGURE 1 the shish-kabob making device is hexagonal in cross-sectional configuration (see FIGURE 5) for the purpose of providing the equally spaced polygonal sides 40, 42 and 44 that may be in sequence exposed to the source of heat for the time desired to uniformly cook the shish-kabob food components to the taste of the user of the device 10. It will be noted that the shish-kabob forming food segments will be firmly held in place within the basket 12 by the securement in place of the cover 28, with the result that the shish-kabob forming components regardless of their physical nature are maintained in their shish-kabob defining relation during the cooking process.

After the shish-kabob is cooked as desired, it is removed from the source of heat and the latch device 38 released so that handle 32 may be operated to swing cover 28 to its fully opened position. The open end 24 of the basket 12 is then disposed just above a plate or the like, and a fork or other implement is inserted between the basket end 22 and the food segment adjacent it, through the basket open top 20, and then the food segments are pushed toward the direction of end 24 and outwardly of same onto the plate in the shish-kabob defining row or order in which they were cooked.

It will thus be seen that we have provided a device for making shish-kabobs which provides for the uniform cooking and ready placement of the shish-kabob on a plate or the like for consumption. The shish-kabob components are securely held in their shish-kabob defining positions during cooking, and when ready for eating, removal is effected easily and without disturbing the appearance or quality of the end product.

FIGURES 6 and 7 illustrate variant basket and cover cross-sectional configurations that may be employed to achieve the objectives of this invention.

*Specific description*

In the embodiment of FIGURES 1–5 and 7, the basket 12 is made up of a plurality of longitudinally extending wire lengths 50 joined together by transversely extending wire lengths 52 to which they may be secured by brazing or other weldment type process as at joints 53. At the end 24 the upper wire lengths 50 that define the open top 20 of the basket 12 are joined together by a bite portion 54 which is given the configuration shown in FIGURE 2 to define the open end 24. The lengths 50 at the end 22 of basket 12 merge together as indicated at 56 to form the closed end 22 and define the handle 14. In the form shown, one of the wires 50 is coiled to define hand hold 15 and hook portion 60 for hanging up the device when it is not in use; however, other forms of handle may be employed, such as a wooden handle.

As already indicated, the latch device 38 comprises a clip 36 which in the form shown is affixed as by brazing or the like to one side of the handle 14 and includes a turned over top portion 34 under which the handle 32 of cover 28 is lodged to hold the cover in its closed position (see FIGURE 8). Alternately, clip 36 may comprise a longer member wrapped about the handle portion and shaped to define top portion 34.

The cover 28 comprises in the form shown a plurality of longitudinally extending wires 62 joined together by spaced transversely extending segments 64. At the end 66 of cover 28 which is to be disposed adjacent the end 24 of basket 12, one of the lengths 62 includes an elongated end portion 63 which is bent as indicated in FIGURE 2 by reference numeral 68 to define with a bent over end portion 70 of the center longitudinal wire length 62 a depending appendage or end portion 72 which is proportioned to close off the basket open end 24 when the cover 28 is swung to its closed position. Wire portions 63 and 70 are joined together and to their adjacent wires 62 in the manner indicated in FIGURES 2 and 5 as by brazing or the like at joints 76.

Depending appendage or end portion 72 alternately may comprise a separate unit fixed to the cover 28 as by brazing.

The wires 62 and 64 are joined together as by brazing or the like at joints 74 where these portions intersect.

The hinge devices 26 in the form illustrated each comprise a formed sheet metal element 80 made from a blank 82 (see FIGURE 4) that is in the form of three quadrilateral appendages 84, 86 and 88 connected together by connecting section 90 which is of reduced dimension in the manner indicated. As indicated in FIGURE 3, the appendages 84, 86 and 88 are doubled over to form eyelets 92, 94 and 96, with the eyelets 92 and 96 being formed about one of the wires 62 running along one side of the cover 28 and an upper end portion of the adjacent basket transverse wire 52 below the wire 50 that it is connected to (see FIGURE 2). Alternately, the eyelets 92 and 96 may be formed about both the indicated wire 62 and the basket wire 50 adjacent it.

The three hinge devices 26 as shown in FIGURES 1 and 2 are applied between the cover 28 and basket 12 in the same manner, and, of course, on the same side of the basket 12, though either side may be employed for this purpose. In the showing of FIGURE 1 they are on one side while in the showing of FIGURE 2 they are on the opposing side of the basket. The number of hinge devices 26 used is optional except that ordinarily at least two will be required for proper hinging purposes.

In the device 10A shown in FIGURE 6, the basket 12A has somewhat of a heart shaped configuration presenting three major sides 100, 102 and 104 to serve as the major reference points for indexing the device for adequate cooking purposes. The device 10A is otherwise the same as that shown in FIGURE 1 with additional longitudinally extending wires being employed to give the transverse elongated dimension indicated.

In the form of FIGURE 7, the device 10B is a triangular configuration presenting the three major sides 110, 112 and 114 for cooking indexing purposes. The device 10B is otherwise the same as that shown in FIGURE 1 except that the wire length requirements are reduced in the manner indicated.

While a brazed wire construction has been employed as the illustrated embodiments, obviously different modes of construction may be employed to fabricate the device 10 as will be obvious to those skilled in the art.

We claim:
1. A device for making shish-kabobs comprising:
an elongate open mesh basket proportioned to define a receptacle of shish-kabob defining configuration for food segments placed therein and having an open top and opposed ends of which one end is closed and the other end open,
said open top portion extending longitudinally of said basket,
a supporting arm secured to said basket adjacent the closed end thereof and including a hand hold portion,
and an open mesh cover proportioned to close the basket open top and hinged to the basket for movement between a first position in which it closes the basket open top and a second position in which it opens said top,
said cover including a depending portion positioned to close off said basket open end in said first position of said cover and open said basket open end in the second position of said cover, and means for releasably securing said cover in said first position, whereby the shish-kabob making food segments may be placed in a shish-kabob forming row in said basket and said cover moved to said first position thereof to close said basket top and open end for shish-kabob cooking purposes, and after cooking, said cover may be moved from said first position to said second position and the shish-kabob forming segments discharged from said basket in said row on a plate or the like by pushing same from the end of the row adjacent the basket closed end and longitudinally of said basket through said open end.

2. The device set forth in claim 1 wherein:
said hand hold portion of said supporting arm is spaced from said basket,
and said cover includes a handle forming member disposed adjacent said hand hold portion.

3. The device set forth in claim 2 wherein:
said releasable securing means comprises means for releasably locking said cover handle forming member from movement with respect to said supporting arm in said first position of said cover.

4. The device set forth in claim 1 wherein:
said cover and basket in said first position of said cover define a polygonal cross-sectional configuration.

5. The device set forth in claim 1 wherein:
said basket is formed from wire elements fixed together to define said configuration and including transversely extending wire elements,
said cover being formed from wire elements fixed together to define a configuration complementing that of said basket,
and including hinge means for hinging said cover to said basket,
said hinge means being anchored to said basket transversely extending elements.

References Cited

UNITED STATES PATENTS

| | | | |
|---|---|---|---|
| D. 164,107 | 7/1951 | Doblin | 99—402 X |
| 691,410 | 1/1902 | Schmertz | 99—402 |
| 1,312,616 | 8/1919 | Cowan | 99—402 |
| 1,795,463 | 3/1931 | Arnaman. | |
| 2,647,454 | 8/1953 | Shelley | 99—441 |
| 3,103,161 | 9/1963 | Whitehead | 99—427 |

WALTER A. SCHEEL, *Primary Examiner.*

J. M. NEARY, *Assistant Examiner.*

U.S. Cl. X.R.

99—394, 426; 128—2.06; 346—34, 110; 178—6.7; 179—2